United States Patent
Shaw et al.

(10) Patent No.: US 12,320,353 B2
(45) Date of Patent: Jun. 3, 2025

(54) VACUUM SYSTEM HAVING CONDENSER AND ROOT VACUUM PUMP SET

(71) Applicants: ELIVAC CO., LTD., Shanghai (CN);
Raymond Zhou Shaw, Shanghai (CN);
ELIVAC INC., Salisbury, MD (US)

(72) Inventors: Raymond Zhou Shaw, Shanghai (CN);
Jian Wei Zhang, Shanghai (CN);
Xiaoqing Pan, Shanghai (CN)

(73) Assignees: ELIVAC CO., LTD, Shanghai (CN);
Raymond Zhou Shaw, Shanghai (CN);
ELIVAC INC.

( * ) Notice: Subject to any disclaimer, the term of this patent is extended or adjusted under 35 U.S.C. 154(b) by 0 days.

(21) Appl. No.: 18/735,199

(22) Filed: Jun. 6, 2024

(65) Prior Publication Data
US 2024/0328417 A1    Oct. 3, 2024

Related U.S. Application Data

(63) Continuation-in-part of application No. 17/485,532, filed on Sep. 27, 2021, now abandoned.

(51) Int. Cl.
*F04C 18/12* (2006.01)
*F04C 23/00* (2006.01)
*F04C 25/02* (2006.01)
*F28B 9/08* (2006.01)
(Continued)

(52) U.S. Cl.
CPC .......... *F04C 18/126* (2013.01); *F04C 23/001* (2013.01); *F04C 25/02* (2013.01); *H02K 9/04* (2013.01); *F04C 2220/10* (2013.01); *F28B 9/08* (2013.01); *F28B 11/00* (2013.01)

(58) Field of Classification Search
CPC ...... F04C 18/126; F04C 23/003; F04C 25/02; F04C 28/02; F04C 28/08; F04C 28/26; F04C 2220/10; F04C 2240/81; F04C 2240/52; F04C 2270/18; F04C 2270/42; F04C 28/065; F04C 28/06; F04C 23/001; F04B 23/04; H02K 9/04; F28B 9/08; F28B 11/00
See application file for complete search history.

(56) References Cited

U.S. PATENT DOCUMENTS

| | | | |
|---|---|---|---|
| 3,642,384 A * | 2/1972 | Huse | F04C 19/00 417/69 |
| 3,922,110 A * | 11/1975 | Huse | F04B 9/02 60/431 |

(Continued)

*Primary Examiner* — Bryan M Lettman

(57) ABSTRACT

A vacuum system has a condenser and a root vacuum pump set, wherein the condenser is an independent inlet condenser set connected to a generator including an air cooling power generator condenser. A pressure sensor is installed on the independent inlet condenser set for detecting a first input pressure. Air outputted from the independent inlet condenser set is compressed by the root vacuum pump set. A backing pump receives an air outputted from the root vacuum pump set through an output pipe. A bypass pipe is connected between an output end of the root vacuum pump set and a vapor-liquid separator connected to the backing pump. A central controller serves to receive the first input pressure and determine to control the air from the root vacuum pump set to be outputted to the output pipe or the bypass pipe by a control valve.

16 Claims, 5 Drawing Sheets

(51) Int. Cl.
 *F28B 11/00* (2006.01)
 *H02K 9/04* (2006.01)

(56) References Cited

U.S. PATENT DOCUMENTS

| | | | | |
|---|---|---|---|---|
| 5,131,817 | A * | 7/1992 | Pastore, Jr. | F04C 29/042 |
| | | | | 417/205 |
| 8,251,678 | B2 * | 8/2012 | Hozumi | F04C 25/02 |
| | | | | 417/247 |
| 2010/0266433 | A1 * | 10/2010 | Suzuki | F04C 18/126 |
| | | | | 418/206.7 |
| 2014/0250978 | A1 * | 9/2014 | McCauley | G01N 30/26 |
| | | | | 73/23.39 |
| 2016/0130984 | A1 * | 5/2016 | Oxner | F01K 7/36 |
| | | | | 60/651 |
| 2018/0023571 | A1 * | 1/2018 | Endo | F04C 18/16 |
| | | | | 418/202 |
| 2019/0309756 | A1 * | 10/2019 | Shaw | F04C 25/02 |
| 2021/0010474 | A1 * | 1/2021 | Coeckelbergs | F04C 28/28 |

\* cited by examiner

VACUUM SYSTEM HAVING CONDENSER AND ROOT VACUUM PUMP SET

The invention is a continuation in part (CIP) of the U.S. patent application Ser. No. 17/485,532 filed at Sep. 27, 2021, invented and assigned to the inventor of the present invention, and thus the contents of the U.S. patent application Ser. No. 17/485,532 is incorporated into the present invention as a part of the specification.

FIELD OF THE INVENTION

The present invention is related to root pumps, and in particular to a vacuum system having a condenser and a root vacuum pump set.

BACKGROUND OF THE INVENTION

Currently, for power generators used in power plants, the power generator sets are divided as water cooling generator sets and air cooling condenser of the generator sets. The types of air cooling power generator sets may be classified into direct air cooling form and indirect air cooling form. A direct air cooling condenser of the generator set has a condenser. On contrast, an indirect air cooling condenser of the generator set has no condenser. An air cooling condenser of the generator is required to be operated under a vacuum state, so maintaining a vacuum system to generate a vacuum state is necessary. The vacuum maintaining system of an air cooling power generator usually uses a liquid circulating vacuum pump system which can be used to maintain a vacuum state.

The prior technology for a liquid circulating vacuum pump system of an air cooling power generator condenser sets mainly uses a single liquid circulating vacuum pump system. However, using above technology consumes large amounts of electric powers and water. The volume of liquid circulating vacuum pump system is large and occupies a big space. Furthermore, the liquid circulating vacuum pump systems generate greater noises and need expensive maintaining costs, so using liquid circulating vacuum pump leads to a large space occupation and higher costs.

Most of power plants use liquid circulating vacuum pumps to improve the vacuum level. The capabilities of drawing air decline, while air etching occurs. Especially in summer, the liquid circulating vacuum pump is easier to be eroded to cause that the capability of drawing air declines rapidly especially, when the temperature is high. Therefore, the vacuum state of air cooling condenser sets becomes worse, and the efficiency of steam turbine is low, so that the coal consumption increases.

The present invention provides a new vacuum system based on a self equipped up front installed condenser set and a multiple stage special custom made roots pumps and liquid ring vacuum system to solve the defects mentioned above.

SUMMARY OF THE INVENTION

Accordingly, the object of the present invention is to provide a vacuum system having an independent condenser set and a root vacuum pump set, wherein the independent inlet condenser set, the root vacuum pump set, the backing pump and the vapor-liquid separator are formed as a vacuum system which is used as vacuum maintaining system for an air cooling power generator set. A central controller is used to switch an output path of the compressed air from the root vacuum pump set between an output pipe of the backing pump or a bypass pipe under different pressures, which can adapt to the wide range of a pressure change of the generator. The vapor-liquid separator further includes a separating blocking plate structure for dispersing, blocking and collecting the high-speed water, which prevents the high-speed water from spraying out from the vapor-liquid separator. In the structure of the present invention, the power and water consumptions of the air cooling power generator system are greatly reduced. The condensed water is reused by using the liquid collecting and recycling tank unit. Therefore, the system of the present invention not only reduces the power consumption, but also reduces the whole maintaining cost. Furthermore the objects of reduction of water usage and environmental protections are achieved.

To achieve above object, the present invention provides a vacuum system having an independent inlet condenser set and a root vacuum pump set, comprising: the independent inlet condenser set having an inlet end connected to a generator including an air cooling power generator condenser; the independent inlet condenser set serving for receiving an input vapor inputted from the air cooling power generator condenser; the input vapor being a mixture of non-condensable air and water steam; the water steam capable of being condensed, and the surplus air being outputted; a pressure sensor installed on the independent inlet condenser set for detecting a first input pressure of the vapor inputted to the inlet end of the independent inlet condenser set; the root vacuum pump set including at least one root vacuum pump; the root vacuum pump set further including an input end and an output end; the input end being connected to the independent inlet condenser set; an air outputted from the independent inlet condenser set being inputted to the at least one root vacuum pump for being compressed and the compressed air being outputted from the output end and a backing pump connected to the output end of the root vacuum pump set by using an output pipe; the backing pump serving to receive an air outputted from the root vacuum pump set; a vapor-liquid separator having an input end which is connected to the backing pump; a bypass pipe connected between the output end of the root vacuum pump set and the input end of the vapor-liquid separator; wherein the vapor-liquid separator serves to receive an input air outputted from the backing pump or the bypass pipe and to separate a vapor and a liquid in the input air; a control valve installed at the output end of the root vacuum pump set and connected to an input end of the output pipe and an input end of the bypass pipe for opening and closing the output pipe and the bypass pipe; a central controller connected to the pressure sensor, the control valve, the heat exchanger and the backing pump; the central controller serving to receive the first input pressure from the pressure sensor and determine to control the compressed air from the root vacuum pump set to be outputted to the output pipe or the bypass pipe by controlling the control valve; and where when the central controller control the control valve to open the output pipe and close the bypass pipe, the backing pump and the heat exchanger are activated by the central controller; the compressed air from the root vacuum pump set is inputted into the output pipe and passes through the heat exchanger and the backing pump to be inputted to the vapor-liquid separator; when the central controller control the control valve to close the output pipe and open the bypass pipe, the backing pump and the heat exchanger are deactivated by the central controller; and the compressed air from the root vacuum pump set is inputted into bypass pipe to pass through the bypass pipe to be directly outputted to the vapor-liquid separator.

DETAILED DESCRIPTION OF THE INVENTION

Figure 1:
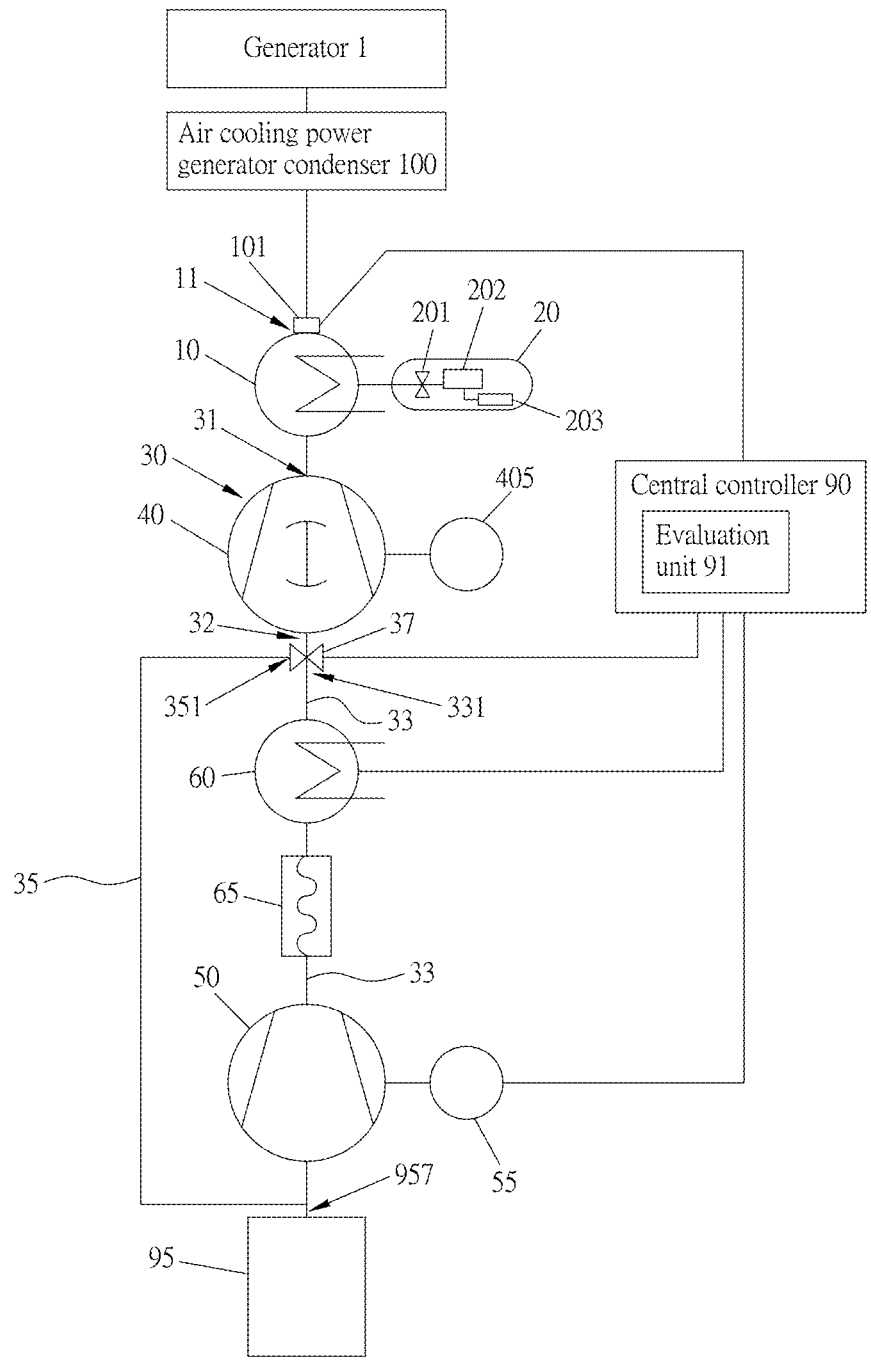
FIG. 1 is a schematic view showing the assembly of the elements of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 6, the structure of the present invention is illustrated. The present invention includes the following elements.

An independent inlet condenser set 10 has an inlet end 11 which is connected to a generator 1 including an air cooling power generator condenser 100. The independent inlet condenser set 10 serves for receiving an input vapor inputted from the air cooling power generator condenser 100. The input vapor of the air cooling power generator condenser 100 is a mixture of non-condensable air and water steam. The water steam in the input vapor is capable of being condensed by the independent inlet condenser set 10 and the volume thereof is reduced for reducing the air amount inputted to the succeeding elements. In this way, the vacuum system is as if enlarged. The inlet end 11 of the independent inlet condenser set 10 is capable of handling a pressure as large as 10000~25000 Pa (Pascal), although higher vacuum level or lower pressure is more favorable. The independent inlet condenser set 10 may be condensers of any form.

The independent inlet condenser set 10 is connected to a liquid collecting and recycling tank unit 20 for collecting condensed liquid (such as soft water) from the independent inlet condenser set 10, in that the soft water from the air cooling power generator condenser 100. The liquid collecting and recycling tank unit 20 has an automatic double valve set up device 201 and a water level gauge 202 that is connected to a water recycling controller 203. The water recycling controller 203 has DCS (Distributed Control System) or PLC (Programmable Logic Control) (not show). Therefore, the liquid collecting and recycling tank unit 20 is capable to recycle soft water automatically and continuously without interrupting the vacuum system working. The condensed liquid and soft water can be reused.

A root vacuum pump set 30 includes at least one root vacuum pump 40. The root vacuum pump set 30 further includes an input end 31 and an output end 32. The input end 31 is connected to the independent inlet condenser set 10. Air outputted from the independent inlet condenser set 10 is inputted to the at least one root vacuum pump 40 for being compressed and the compressed air is outputted from the output end 32. Any of the root vacuum pump 40 may be any kind of root vacuum pump, preferably, it can suffer from pressure greater than one or several tens of thousands Pa, for example, two blade root vacuum pump, three blade root vacuum pumps, air cooling root vacuum pump, or cascade root vacuum pump, etc.

Figure 4:
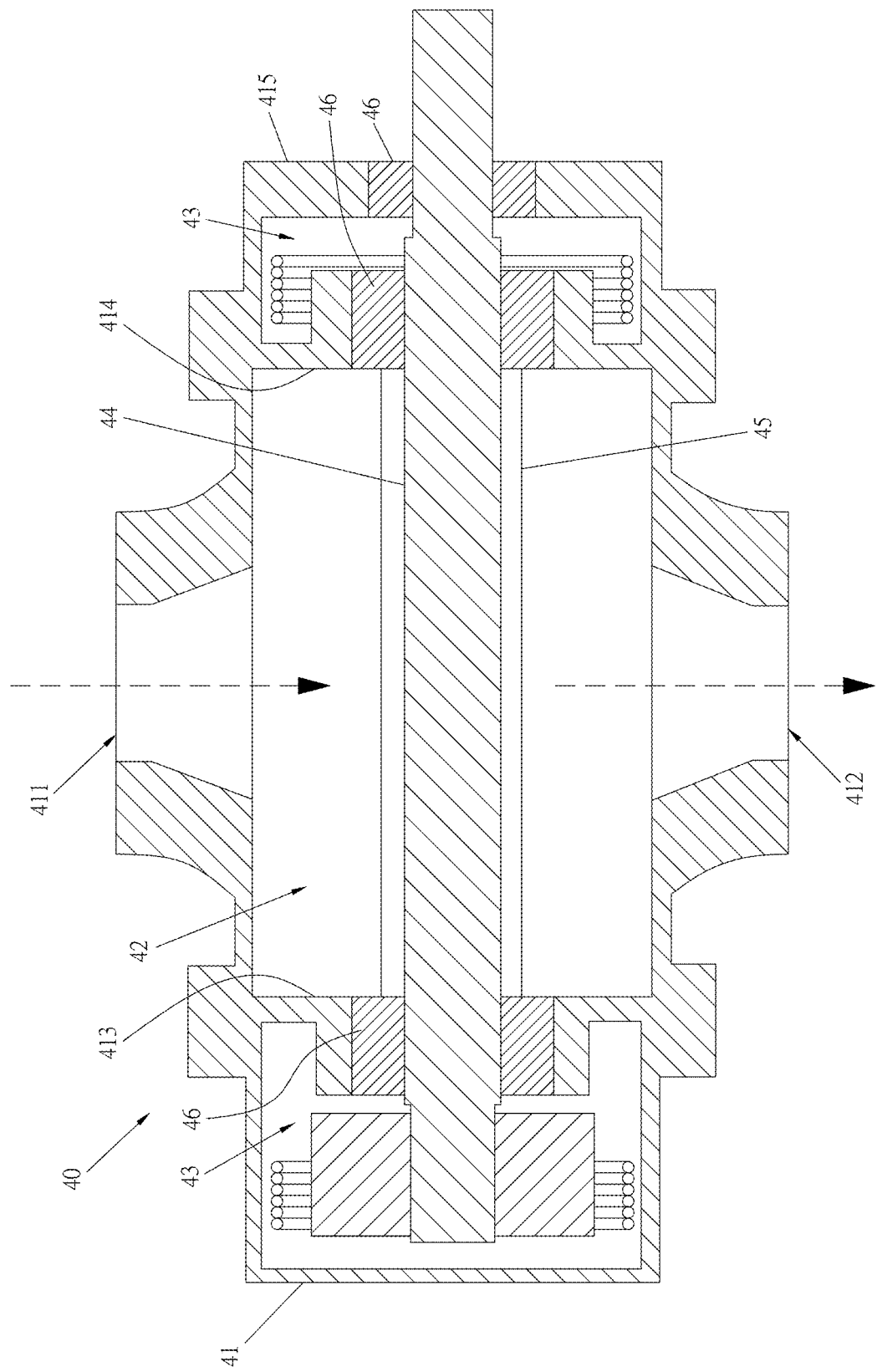
FIG. 4 is a schematic cross section view of the root vacuum pump of the present invention.

Referring to FIG. 4, each said root vacuum pump 40 has a casing 41 which has an inlet 411 and an outlet 412. An interior of the casing 41 is formed with a vacuum chamber 42 and two bearing rooms 43 at two sides of the vacuum chamber 42. The vacuum chamber 42 is connected and communicated to the inlet 411 and the outlet 412. A driving shaft 44 is installed within the casing 41 and penetrates through the vacuum chamber 42 and the two bearing rooms 43. One end of the driving shaft 44 passes out of a right wall 415 of the casing 41. A blade set 45 is installed within the vacuum chamber 42 and is installed on the driving shaft 44. The gas is inputted from the inlet 411 to the vacuum chamber 42. By rotation of the blade set 45, the gas is compressed and is discharged through the outlet 412.

Inner connection walls 413, 414 between the vacuum chamber 42 and the two bearing rooms 43 are installed with respective bearings 46 which are arranged to be around the driving shaft 44; as well as an opening of the right wall 415 of the casing 41 is formed with another bearing 46 around the driving shaft 44. The bearings 46 support the driving shaft 44. The bearings 46 completely seal spaces between the driving shaft 44 and the inner connection walls of the casing 41 so that the vacuum chamber 42 is completely isolated from the two bearing rooms 43. Therefore, liquid out in the casing 41 and in the two bearing rooms 43 cannot permeate into the vacuum chamber 42. Furthermore, gas in the vacuum chamber 42 cannot enter into the bearing rooms 43. Therefore, in operation, an interior of the vacuum chamber 42 of the root vacuum pump 40 only pumps air and the gas from the independent inlet condenser set 10 without any impurities. Moreover, liquid within the bearing rooms 43 cannot drain out of the casing 41.

In the present invention, the root vacuum pump 40 has a complete sealing structure, which is not half-sealed structure. Therefore, in the present invention, the vacuum chamber 42, the bearing rooms 43 and other related driving structures (such as gears) are completely isolated from liquid so as to avoid of the problems of vapors, emulsions or drainages, etc.

Preferably, each of the at least one root vacuum pump 40 is capable of receiving a vapor with an second input pressure of 10000 Pa to 30000 Pa (Pascal), and suffering from a pressure differential larger than 10000 Pa (Pascal), wherein the pressure differential is an amount of difference between the second input pressure and a output pressure of each of the at least one root vacuum pump 40. The at least one root vacuum pump 40 can be operated 24/7 (twenty four seven) under above pressure condition. General prior root vacuum pump cannot work under above pressure condition.

The root vacuum pump 40 is a high temperature tolerance pump, that is, the root vacuum pump 40 can operates at a temperature between 130° C. and 200° C. In operation, the gas temperature of the vacuum chamber 42 of the root vacuum pump 40 will achieve to 200° C.

With reference to FIG. 1, the root vacuum pump set 30 maybe has only one root vacuum pump 40.

Figure 2:
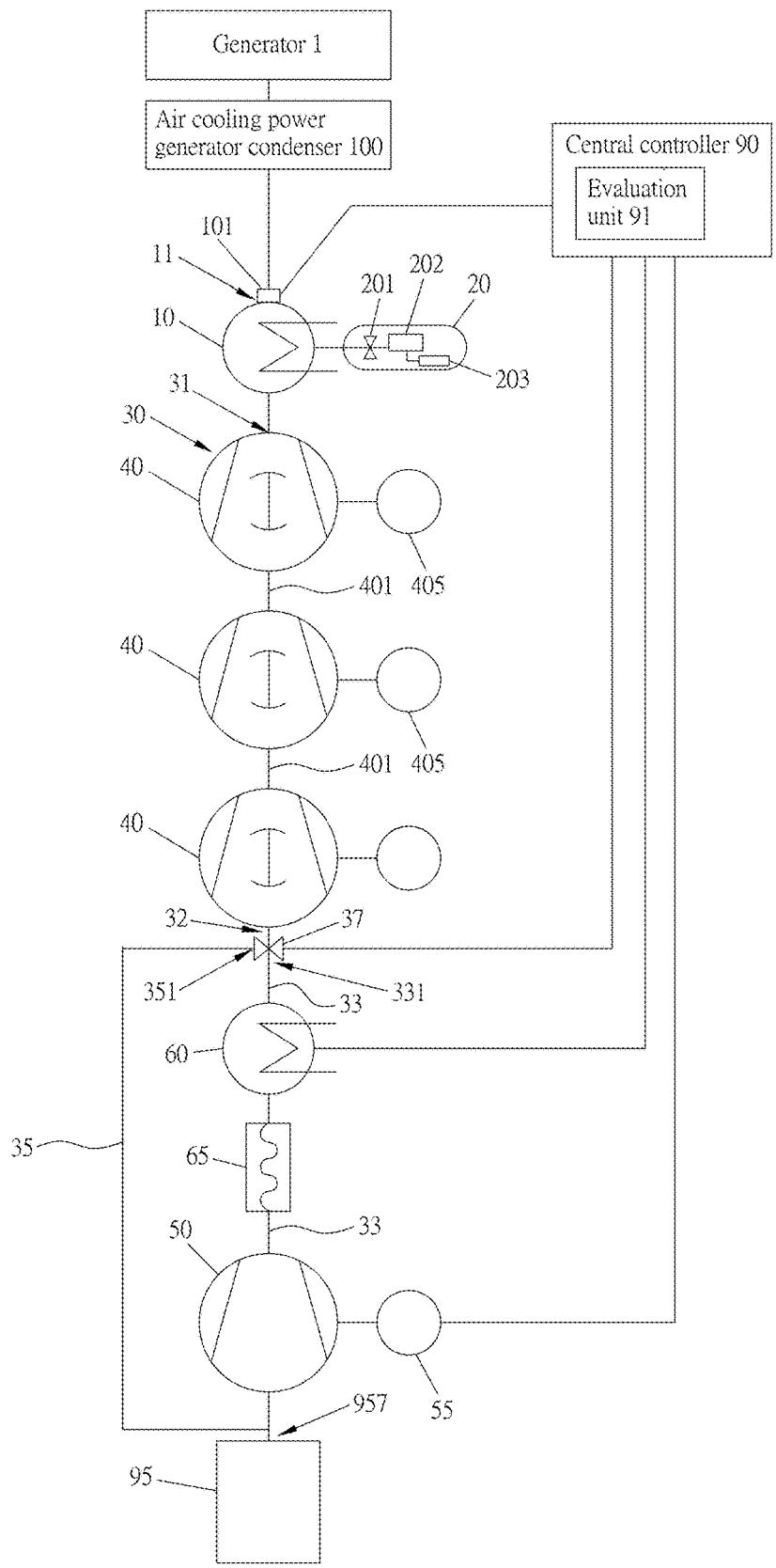
FIG. 2 is a schematic view showing another assembly of the elements of the present invention.

Referring to FIG. 2, the root vacuum pump set 30 includes a plurality of root vacuum pumps 40 which are serially connected. The air outputted from the independent inlet condenser set 10 flows through the plurality of root vacuum pumps 40 sequentially for being compressed several times. Two adjacent root vacuum pumps 40 are connected by an air pipe 401.

The at least root vacuum pump 40 is maybe a root vacuum pump 40 or a plurality of root vacuum pumps 40 for dividing the total pressure so that the whole power in the system is reduced and the water consumed is decreased.

A backing pump 50 is connected to the output end 32 of the root vacuum pump set 30 by using an output pipe 33. The backing pump 50 serves to receive air outputted from the root vacuum pump set 30. The backing pump 50 is a backing pump of any form, such as a liquid circulated pump, a vapor jet pump, an atmosphere jet pump or a water flushing pump.

At least one electric driving device 405 is connected to the at least one root vacuum pump 40 respectively for driving the at least one respective root vacuum pump 40.

By the above mentioned structure, the root vacuum pump set 30 serves to compress air from the independent inlet condenser set 10 so as to reduce the volume of the air. Therefore, the air pumped from the backing pump 50 is reduced.

A heat exchanger 60 is serially connected to the output pipe 33 for cooling air outputted from the root vacuum pump set 30 and the cooled air is inputted to the backing pump 50. The heat exchanger 60 may be a heat exchanger of any form. A wave shape pipe 65 is installed on the output pipe 33 for retaining the preferred sealing effect of the output pipe 33.

A pressure sensor 101 is installed on the independent inlet condenser set 10 for detecting a first input pressure of the vapor inputted to the inlet end 11 of the independent inlet condenser set 10.

A vapor-liquid separator 95 has an input end 957 which is connected to the backing pump 50.

A bypass pipe 35 is connected between the output end 32 of the root vacuum pump set 30 and the input end 957 of the vapor-liquid separator 95.

The vapor-liquid separator 95 serves to receive an input air outputted from the backing pump 50 or the bypass pipe 35 and to separate a vapor and a liquid in the input air.

A control valve 37 is installed at the output end 32 of the root vacuum pump set 30 and connected to an input end 331 of the output pipe 33 and an input end 351 of the bypass pipe 35 for opening and closing of the output pipe 33 and the bypass pipe 35.

A central controller 90 is connected to the pressure sensor 101, the control valve 37, the heat exchanger 60 and the backing pump 50. The central controller 90 serves to receive the first input pressure from the pressure sensor 101 and determine to control the compressed air from the root vacuum pump set 30 to be outputted to the output pipe 33 or the bypass pipe 35 by controlling the control valve 37.

When the central controller 90 control the control valve 37 to open the output pipe 33 and close the bypass pipe 35, the backing pump 50 and the heat exchanger 60 are activated by the central controller 90. The compressed air from the root vacuum pump set 30 is inputted into the output pipe 33 and passes through the heat exchanger 60 and the backing pump 50 to be inputted to the vapor-liquid separator 95. When the central controller 90 control the control valve 37 to close the output pipe 33 and open the bypass pipe 35, the backing pump 50 and the heat exchanger 60 are deactivated by the central controller 90. The compressed air from the root vacuum pump set 30 is inputted into bypass pipe 35 to pass through the bypass pipe 35 to be directly outputted to the vapor-liquid separator 95.

The central controller 90 includes an evaluation unit 91. In the evaluating of the first input pressure, the evaluation unit 91 serves to compare the first input pressure with a threshold pressure. When the first input pressure is larger than the threshold pressure, the central controller 90 closes the output pipe 33 and opens the bypass pipe 35.

Figure 5:
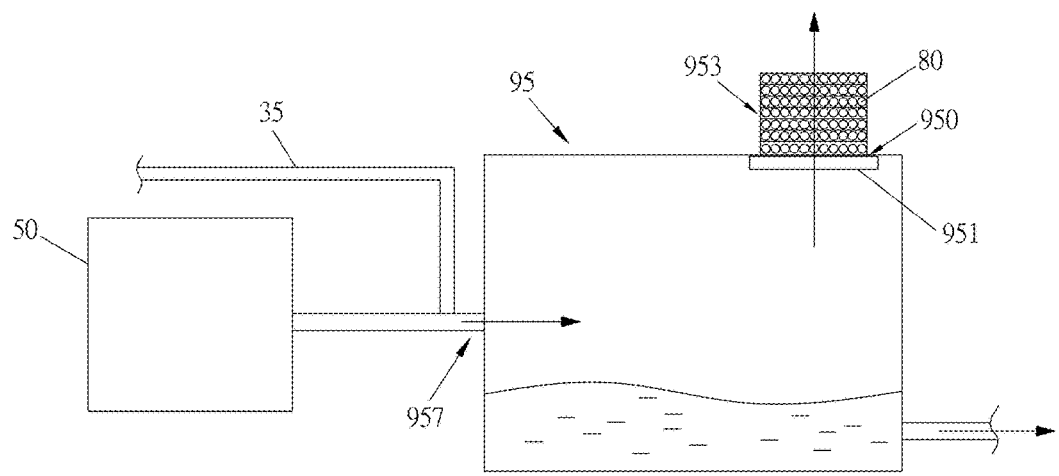
FIG. 5 is a schematic view of the vapor-liquid separator of the present invention.
Figure 6:
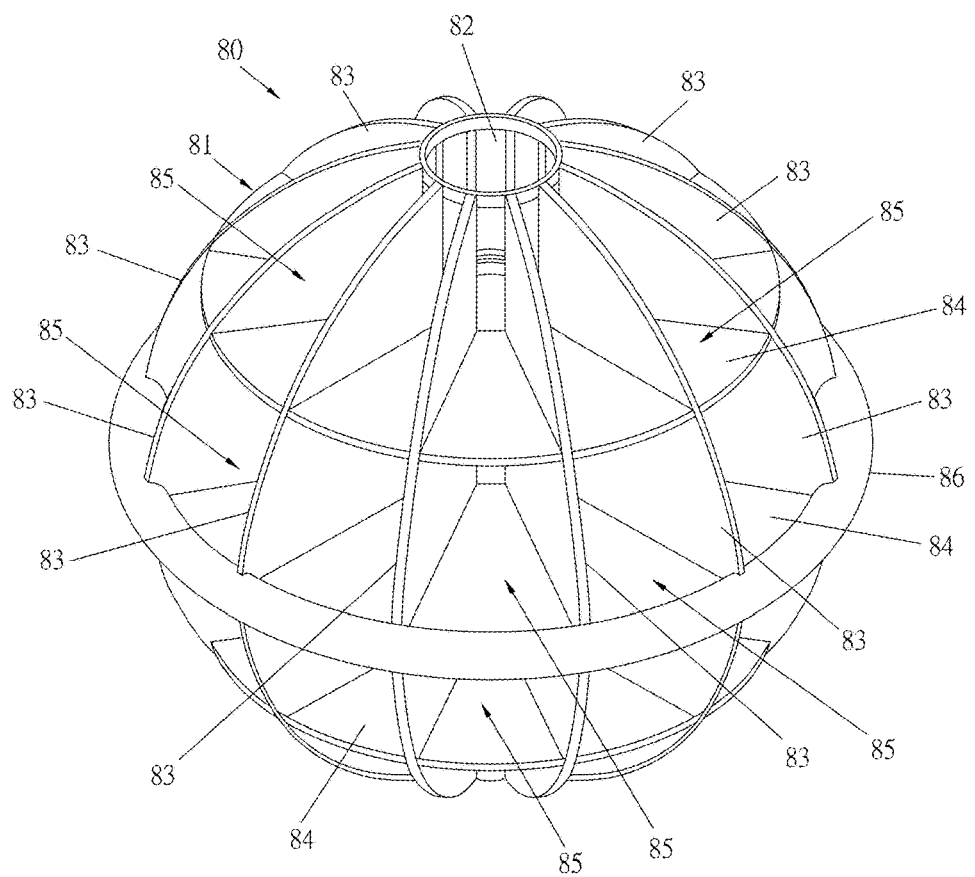
FIG. 6 is a schematic view of the multi-directional vapor-liquid separating filling structure.

In the present invention, the air pressure of the vapor within the independent inlet condenser set 10 may be 10000~30000 Pa (Pascal) under some circumstance (such as under a high temperature during the summer), which causes compressed air from the root vacuum pump set 30 has a very high pressure and affects the stability of the operation of the backing pump 50. Moreover, because the compressed air has a sufficiently high pressure, it is not needed to be further processed by the backing pump 50. Therefore, with the central controller 90, an output path of the air from the root vacuum pump set 30 can be switched to the output pipe 33 or the bypass pipe 35 for switching an operation state of the vacuum system of the present invention under different pressures, which can adapt to the wide range of a pressure change of the generator 1 and ensure the stability of the whole system. FIG. 5 shows an example of the controlling of the central controller 90, wherein two vacuum pumps 40 are activated, the surplus one vacuum pump 40 and the backing pump 50 are deactivated to be in the bypass state.

An electric driving device 55 is connected to the backing pump 50 for driving the backing pump 50. The electric driving device 55 is controlled by the central controller 90 for activating or deactivating the backing pump 50.

The vapor-liquid separator 95 has a vapor output end 950 to output the vapor separated from the input air. A separating blocking plate structure 953 is installed on a separating plate 951 in the vapor output end 950 of the vapor-liquid separator 95. The separating blocking plate structure 953 is a multi-layered structure including a plurality of multi-directional vapor-liquid separating filling structures 80 for dispersing, blocking and collecting a high-speed water in the input air, which prevents the high-speed water from spraying out from the vapor output end 950. Preferably, a number of multi-directional vapor-liquid separating filling structures 80 is from tens to hundreds.

Each of the multi-directional vapor-liquid separating filling structures 80 is a ball structure 81. A vertical through hole 82 is formed on a center of the ball structure 81 and passes through the ball structure 81. A plurality of vertical separating sheets 83 surround an outer side of the through hole 82. Each of the vertical separating sheets 83 has a curved outer side. A plurality of horizontal separating sheets 84 extend horizontally from the vertical through hole 82 and are perpendicular to the vertical separating sheets 83. Each of the horizontal separating sheets 84 has a circular outer side. A plurality of grooves 85 are formed between the vertical separating sheets 83 and the horizontal separating sheets 84. An outer horizontal ring 86 surrounds the outer circular outer side of one of the horizontal separating sheets 84. With above structure, the high-speed water can be dispersed, blocked and collected by the ball structure 81 of the multi-directional vapor-liquid separating filling structure 80.

In the present invention, the air pressure of the vapor within the independent inlet condenser set 10 may be 10000~30000 Pa (Pascal) under some circumstance (such as under a high temperature during the summer), which causes the vapor forms a supersaturated water vapor having a high amount of water. The supersaturated water vapor with the high air pressure will decrease the vapor-liquid separating performance of a traditional vapor-liquid separator and cause the high-speed water easily passes through the separating plate 951 and sprays out from the vapor output end of the traditional vapor-liquid separator. Therefore, by the separating blocking plate structure 953 of the present invention, the high-speed water is dispersed, blocked and collected, which prevents the high-speed water from spraying out from the vapor output end 950, increases the vapor-liquid separating performance of the vapor-liquid separator 95, and avoids the waste of the spraying water.

Figure 3:
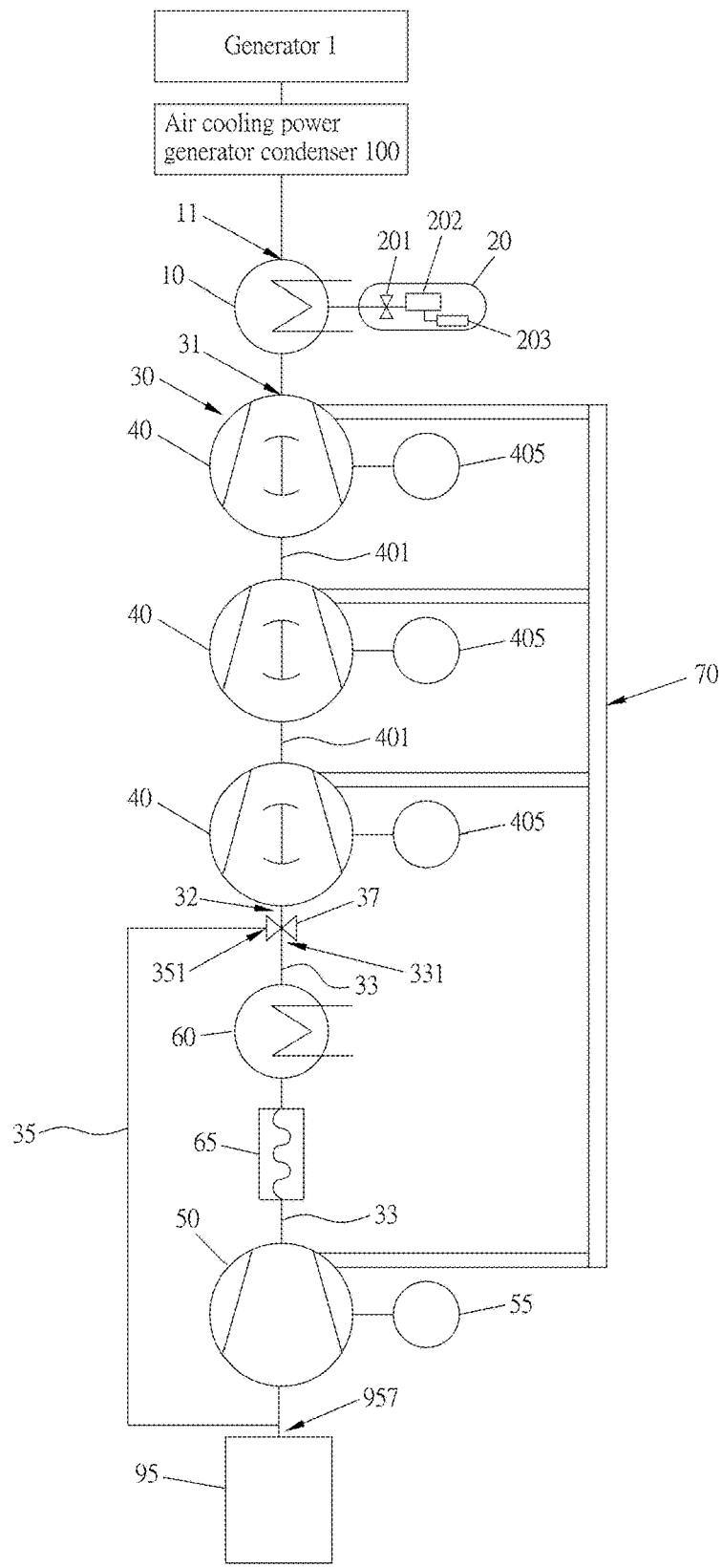
FIG. 3 is a schematic view showing a further assembly of the elements of the present invention, wherein the central controller is not shown.

Referring to FIG. 3, the present invention further includes a supporting frame 70 which is connected to the root vacuum pump set 30 and the backing pump 50. The supporting frame 70 serves to support the root vacuum pump set 30 and the backing pump 50. Preferably, the supporting frame 70 includes the steel welding elements.

Advantages of the present invention are that: the independent inlet condenser set, the root vacuum pump set and the backing pump are formed as a vacuum system which is used as vacuum maintaining system for an air cooling power generator set. In the structure of the present invention, the power and water consumptions of the air cooling power generator system is greatly reduced. The condensed water is reused by using the liquid collecting and recycling tank unit. Therefore, the system of the present invention not only reduces the power consumption, but also reduces the whole maintaining cost. Furthermore the objects of reduction of water usage and environmental protections are achieved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A vacuum system having an independent inlet condenser set and a root vacuum pump set, comprising:
   the independent inlet condenser set (10) having an inlet end (11) connected to a generator (1) including an air cooling power generator condenser (100); the independent inlet condenser set (10) serving for receiving an input vapor inputted from the air cooling power generator condenser (100); the input vapor being a mixture of non-condensable air and water steam; the water steam capable of being condensed, and the surplus air being outputted;
   a pressure sensor (101) installed on the independent inlet condenser set (10) for detecting a first input pressure of the vapor inputted to the inlet end (11) of the independent inlet condenser set (10);
   the root vacuum pump set (30) including at least one root vacuum pump (40); the root vacuum pump set (30) further including an input end (31) and an output end (32); the input end (31) being connected to the independent inlet condenser set (10); an air outputted from the independent inlet condenser set (10) being inputted to the at least one root vacuum pump (40) for being compressed and the compressed air being outputted from the output end (32) and
   a backing pump (50) connected to the output end (32) of the root vacuum pump set (30) by using an output pipe (33); the backing pump (50) serving to receive an air outputted from the root vacuum pump set (30);
   a vapor-liquid separator (95) having an input end (957) which is connected to the backing pump (50);
   a bypass pipe (35) connected between the output end (32) of the root vacuum pump set (30) and the input end (957) of the vapor-liquid separator (95); the vapor-liquid separator (95) serving to receive an input air outputted from the backing pump (50) or the bypass pipe (35) and to separate a vapor and a liquid in the input air;
   a control valve (37) installed at the output end (32) of the root vacuum pump set (30) and connected to an input end (331) of the output pipe (33) and an input end (351) of the bypass pipe (35) for opening and closing the output pipe (33) and the bypass pipe (35);
   a central controller (90) connected to the pressure sensor (101), the control valve (37), the heat exchanger (60) and the backing pump (50); the central controller (90) serving to receive the first input pressure from the pressure sensor (101) and determine to control the compressed air from the root vacuum pump set (30) to be outputted to the output pipe (33) or the bypass pipe (35) by controlling the control valve (37);
   wherein when the central controller (90) controls the control valve (37) to open the output pipe (33) and close the bypass pipe (35), the backing pump (50) and the heat exchanger (60) are activated by the central controller (90); the compressed air from the root vacuum pump set (30) is inputted into the output pipe (33) and passes through the heat exchanger (60) and the backing pump (50) to be inputted to the vapor-liquid separator (95); and
   wherein when the central controller (90) controls the control valve (37) to close the output pipe (33) and open the bypass pipe (35), the backing pump (50) and the heat exchanger (60) are deactivated by the central controller (90); and the compressed air from the root vacuum pump set (30) is inputted into bypass pipe (35) to pass through the bypass pipe (35) to be directly outputted to the vapor-liquid separator (95).

2. The vacuum system having the independent inlet condenser set and the root vacuum pump set as claimed in claim 1, wherein the central controller (90) includes an evaluation unit (91); in the evaluating of the first input pressure, the evaluation unit (91) serves to compare the first input pressure with a threshold pressure; and when the first input pressure is larger than the threshold pressure, the central controller (90) closes the output pipe (33) and opens the bypass pipe (35).

3. The vacuum system having the independent inlet condenser set and the root vacuum pump set as claimed in claim 1, wherein the vapor-liquid separator (95) has a vapor output end (950) to output the vapor separated from the input air; a separating blocking plate structure (953) is installed on a separating plate (951) in the vapor output end (950) of the vapor-liquid separator (95); the separating blocking plate structure (953) is a multilayered structure including a plurality of multi-directional vapor-liquid separating filling structures (80) for dispersing, blocking and collecting a high-speed water in the input air, which prevents the high-speed water from spraying out from the vapor output end (950).

4. The vacuum system having the independent inlet condenser set and the root vacuum pump set as claimed in claim 3, wherein each of the multi-directional vapor-liquid separating filling structures (80) is a ball structure (81); a vertical through hole (82) is formed on a center of the ball structure (81) and passes through the ball structure (81); a plurality of vertical separating sheets (83) surround an outer side of the through hole (82); each of the vertical separating sheets (83) has a curved outer side; a plurality of horizontal separating sheets (84) extend horizontally from the vertical through hole (82) and are perpendicular to the vertical separating sheets (83); each of the horizontal separating sheets (84) has a circular outer side; a plurality of grooves (85) are formed between the vertical separating sheets (83) and the horizontal separating sheets (84); an outer horizontal ring (86) surrounds the outer circular outer side of one of the horizontal separating sheets (84).

5. The vacuum system having the independent inlet condenser set and the root vacuum pump set as claimed in claim 1, wherein the independent inlet condenser set (10) is connected to a liquid collecting and recycling tank unit (20) for collecting condensed liquid which is soft water from the independent inlet condenser set (10), the soft water is from the air cooling power generator condenser (100).

6. The vacuum system having the independent inlet condenser set and the root vacuum pump set as claimed in claim 5, wherein the liquid collecting and recycling tank unit (20) has an automatic double valve set up device (201) and a water level gauge (202) that is connected to a water recycling controller (203); and the liquid collecting and recycling tank unit (20) is capable of collecting condensed liquid and soft water in a vacuum state automatically and continuously.

7. The vacuum system having the independent inlet condenser set and the root vacuum pump set as claimed in claim 1, wherein the inlet end (11) of the independent inlet condenser set (10) is capable of handling a pressure as large as 10000-25000 Pa.

8. The vacuum system having the independent inlet condenser set and the root vacuum pump set as claimed in claim 1, further comprising: a heat exchanger (60) serially connected to the output pipe (33) for cooling air outputted from the root vacuum pump set (30) and the cooled air being inputted to the backing pump (50).

9. The vacuum system having the independent inlet condenser set and the root vacuum pump set as claimed in claim 1, wherein each of the at least one root vacuum pump (40) is capable of receiving a vapor with an second input pressure of 10000 Pa to 30000 Pa (Pascal) and handling a pressure differential as large as 10000 Pa (Pascal), wherein the pressure differential is an amount of difference between the second input pressure and a output pressure of each of the at least one root vacuum pump (40).

10. The vacuum system having the independent inlet condenser set and the root vacuum pump set as claimed in claim 1, wherein each of the at least one the root vacuum pump (40) is an air cooling root vacuum pump.

11. The vacuum system having the independent inlet condenser set and the root vacuum pump set as claimed in claim 1, further comprising at least one electric driving device (405) connected to the at least one root vacuum pump (40) respectively for driving the at least one respective root vacuum pump (40).

12. The vacuum system having the independent inlet condenser set and the root vacuum pump set as claimed in claim 1, wherein the at least one root vacuum pump (40) of the root vacuum pump set (30) is one root vacuum pump.

13. The vacuum system having the independent inlet condenser set and the root vacuum pump set as claimed in claim 1, wherein the root vacuum pump set (30) includes a plurality of root vacuum pumps (40) which are serially connected; the air outputted from the independent inlet condenser set (10) flows through the plurality of root vacuum pumps (40) sequentially for being compressed several times; and two adjacent root vacuum pumps (40) are connected by an air pipe (401).

14. The vacuum system having the independent inlet condenser set and the root vacuum pump set as claimed in claim 1, wherein the backing pump (50) is a liquid circulated pump.

15. The vacuum system having the independent inlet condenser set and the root vacuum pump set as claimed in claim 1, wherein each of the at least one root vacuum pump (40) has a casing (41) which has an inlet (411) and an outlet (412); an interior of the casing (41) is formed with a vacuum chamber (42) and two bearing rooms (43) at two sides of the vacuum chamber (42); the vacuum chamber (42) is connected and communicated to the inlet (411) and the outlet (412); a driving shaft (44) is installed within the casing (41) and penetrates through the vacuum chamber (42) and the two bearing rooms (43); one end of the driving shaft (44) passes out of a right wall (415) of the casing (41); a blade set (45) is installed within the vacuum chamber (42) and is installed on the driving shaft (44); gas is inputted from the inlet (411) to the vacuum chamber (42); by rotation of the blade set (45), the gas is compressed and is discharged through the outlet (412); inner connection walls (413), (414) between the vacuum chamber (42) and the two bearing rooms (43) are installed with respective bearings (46) which are arranged to be around the driving shaft (44); as well as an opening of the right wall (415) of the casing (41) is formed with another bearing (46) around the driving shaft (44); the bearings (46) support the driving shaft (44); the bearings (46) completely seal spaces between the driving shaft (44) and the inner connection walls of the casing (41) so that the vacuum chamber (42) is completely isolated from the two bearing rooms (43); therefore, liquid in the casing (41) and in the two bearing rooms (43) cannot permeate into the vacuum chamber (42); furthermore, gas in the vacuum chamber (42) cannot enter into the bearing rooms (43); in operation, an interior of the vacuum chamber (42) of the root vacuum pump (40) only pumps air and the gas from the independent inlet condenser set 10 without any impurities; moreover, liquid within the bearing rooms (43) cannot drain out of the casing (41).

16. The vacuum system having the independent inlet condenser set and the root vacuum pump set as claimed in claim 15, wherein each of the at least one root vacuum pump (40) operates at a temperature between 130° C. and 200° C.

\* \* \* \* \*